July 4, 1944.

J. W. OLSTAD 2,352,655

BUBBLE TOWER

Filed July 26, 1940

INVENTOR
John Walter Olstad
BY
Popp and Popp
ATTORNEYS

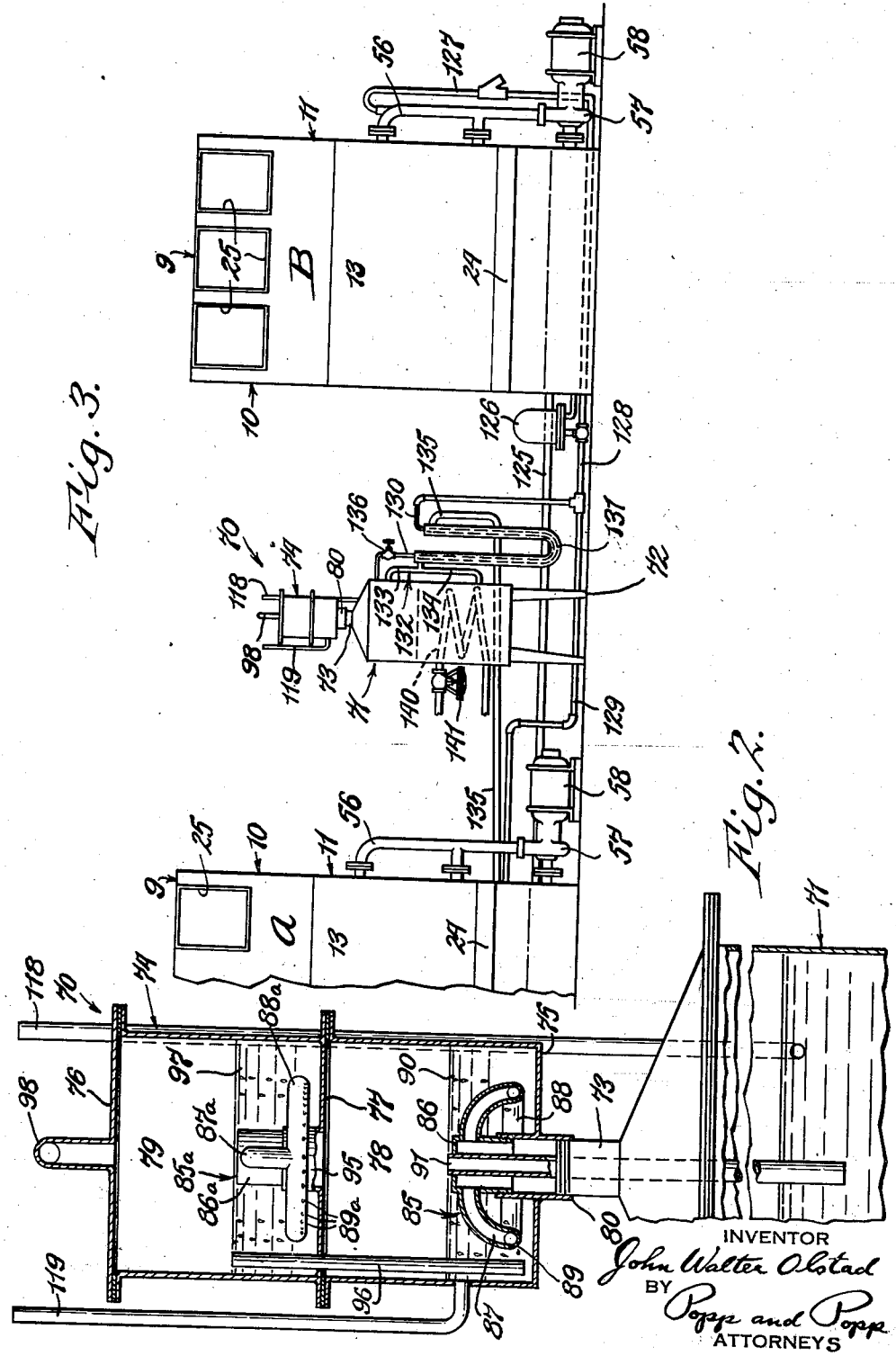

Patented July 4, 1944

2,352,655

UNITED STATES PATENT OFFICE 2,352,655

BUBBLE TOWER

John Walter Olstad, Buffalo, N. Y., assignor to Niagara Blower Company, New York, N. Y., a corporation of New York Application July 26, 1940, Serial No. 347,705

1 Claim. (Cl. 261—114)

This invention relates to a bubble tower and more particularly to a bubble tower for a concentrator and more particularly to apparatus for regenerating the refrigerated spray water containing an antifreeze compound, which spray water is used to cool and humidify or dehumidify the air in the room.

The invention particularly relates to the regeneration of the spray water containing an antifreeze compound and used in connection with the air conditioning of an enclosure wherein various foods are preserved or ripened under conditions of temperature varying between −20 and +50 or 60° F. The major portion of such food preservation is accomplished at room temperatures near or slightly above the freezing point of water. In the preservation and ripening of foods held in cold storage it is important that the relative humidity be maintained comparatively high, at or near 80%. One of the best ways to accomplish this is to treat the air in a spray type of air conditioner in which the room air is recirculated through copious sprays of a liquor made up principally of water. Food products kept in cold storage tend to dry out unless the air has a comparatively high relative humidity and also certain reactions may take place within the foods causing them to give off carbon dioxide and various esters and unless the carbon dioxide and esters are removed from the atmosphere in which the foods are contained they accumulate and retard the processing of the foods. Since they are soluble in water the passage of the room air through a spray chamber operates to remove such gases, the gases being absorbed by the spray liquor.

In operating such a system for the cold storage of foods, a certain amount of damp, warm air enters the room from the warm outside as by the opening of access doors and infiltration through the walls, floor and ceiling. Furthermore, the foods generally give off a certain amount of moisture to the air and the workers in the room likewise add moisture to the air. This moisture added to the air must be removed in the air conditioning unit, the sprays condensing this excess water in the air and this water increasing the water content of the spray chamber causing an overflow from the tank immediately under the sprays.

Since low temperatures are generally carried in the air of the cold storage room it is necessary to incorporate an antifreeze medium in the water used in the spray chamber. Heretofore it has been the practice to use salt for this purpose. I have found, however, that instead of salt highly desirable results can be obtained by using an antifreeze liquid which is miscible with water, such as one of the higher alcohols. However, such antifreeze liquors are more expensive than brine and are also more difficult to remove from the spray water by usual regenerative processes.

It is therefore the principal object of this invention to provide a bubble tower for a concentrator for removing the excess water caused by dilution, through dehumidification, of the antifreeze liquor used in spray coolers which regeneration removes all of the excess water without the removal of any substantial part of the antifreeze medium contained in the spray water, particularly when such antifreeze liquid is itself a liquid which is miscible with water.

Another object of the invention is to provide a bubble tower for such regeneration which is automatic in operation and which will operate with a minimum consumption of the heating medium employed for removing the excess water.

Another purpose of the invention is to provide a bubble tower for such a regenerator at concentrator which is a simple and inexpensive in construction thereby to permit of its being sold and installed at low cost.

In the accompanying drawings:

Fig. 2 is a fragmentary, vertical, central section through the bubble tower and the upper part of the concentrating tank forming the regenerator, this section being taken on line 2—2, Fig. 1.

Fig. 3 is a diagrammatic view showing a series of spray coolers connected with a single regenerator having a bubble tower embodying my invention, this regenerator being shown as heated by steam.

Figure 1:
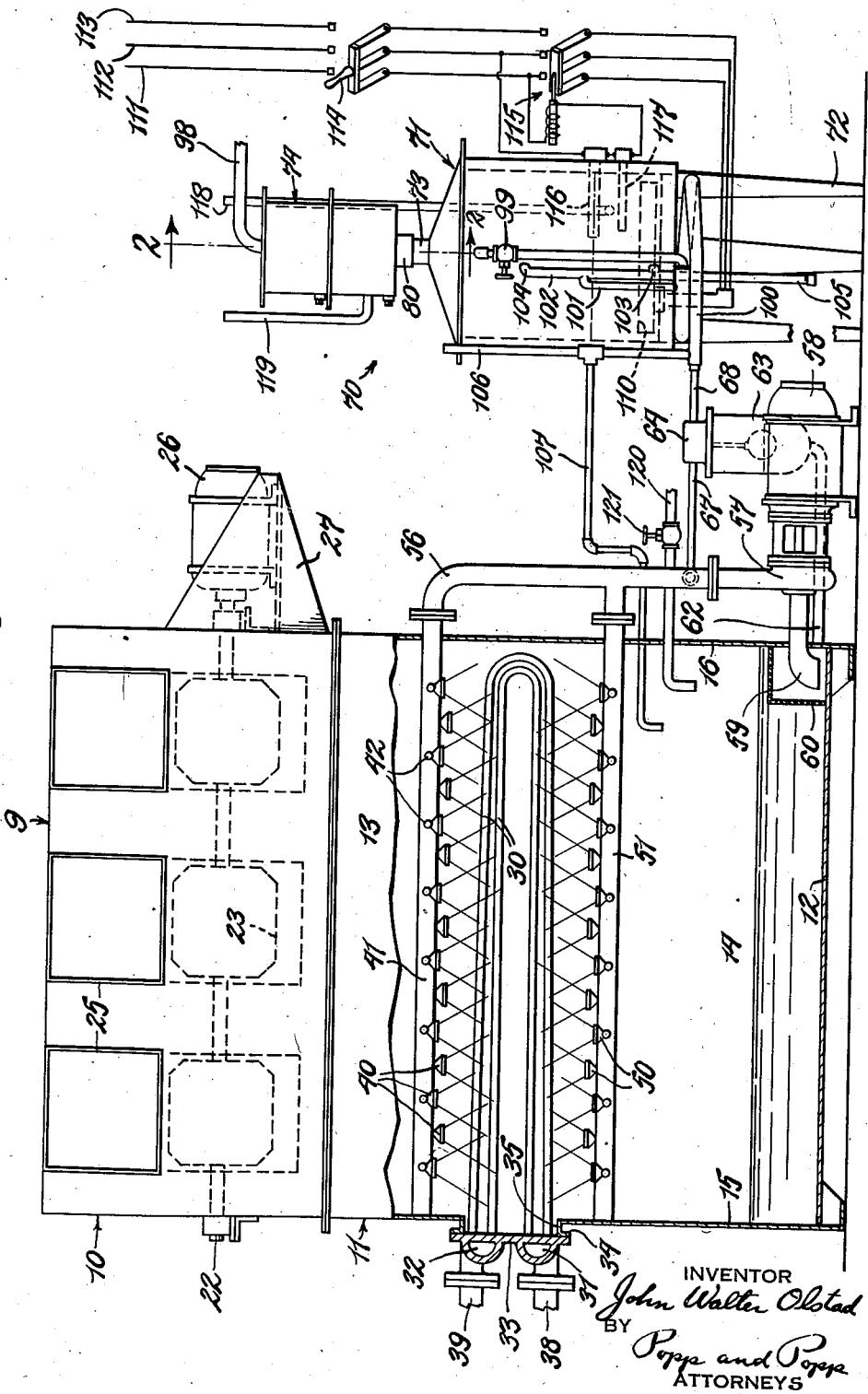
Fig. 1 is a front elevation, partly in section, of a spray cooler through which the air in the cold storage room is recirculated and showing diagrammatically associated therewith a regenerator having a bubble tower embodying the features of my invention, the regenerator being shown as heated by electricity.

The spray cooler in connection with which the regenerator is employed is designated at 9 and is shown as having a casing composed of two sections 10 and 11, the lower section 11 housing the cooling coils and sprays and the upper section 10 housing the discharge fan. The lower section 11 consists of a bottom 12, a front wall 13, a rear wall 14 and end walls 15 and 16. The upper casing section 10 is made of box form and is made in the same general manner as the lower casing section 11. In the end walls of the upper section 10 is journaled a fan shaft 22 which is shown as carrying three fan rotors 23 which draw up air through an inlet box 24 in the lower casing section and discharge it through outlets 25, these outlets being preferably directed to discharge the air horizontally. The fan shaft 22 is driven by a motor 26 which is suitably supported by a bracket 27. The cooling surface is shown as composed of a plurality of smooth surfaced aluminum hairpin tubes 30 having upper and lower legs, the lower legs being connected to an inlet header 31 and the upper legs being connected to an outlet header 32. These headers 31 and 32 are preferably connected by a single integral tube sheet 33 and the edges of this tube sheet are removably secured to the flanges 34 surrounding an opening 35 in the side wall 15. The hairpin tubes and the headers are insertable and removable as a unit into and out of the lower casing section 11.

Any suitable cooling medium can be employed but where low temperatures are desired ammonia or other gaseous refrigerant can be directly expanded in the hairpin tubes 30, the refrigerant being supplied from an inlet line 38 and the expanded gas being removed from an outlet line 39.

High heat transfer efficiency is obtained by supplying water containing an antifreeze medium through a multiplicity of jets directly on the hairpin tubes 30, these jets being arranged above and below the hairpin tubes so that the spray water impinging on the tubes forms a thin film around each tube and is rapidly whirled around each tube. It has been found that this effect is obtained by arranging the jets so that the downward and upward sprays work in direct opposition to one another, the sprays being arranged sufficiently close to the tubes so that the spray water impinges directly thereon and the film formed thereon is whirled by the high velocity of the spray water. For this purpose upper nozzles 40 are arranged in several longitudinal rows, the central row being mounted directly on the underside of a pipe 41 and the outer rows of nozzles being carried by lateral branches 42 which are connected to the central longitudinal pipe 41. The upwardly directed spray nozzles 50 below the coils are mounted on a longitudinal pipe 51 in the same manner as the upper nozzles. Both pipes 41 and 51 are connected by a common supply pipe 56 to the outlet of a circulating pump 57, this pump being driven by a motor 58. This pump withdraws spray water from the bottom of the lower casing section 11, through a pump inlet 59. The inlet opening of the pump inlet 59 is preferably disposed against the bottom 12 of the lower casing section and the pump 57 is preferably arranged below the level of the water in the bottom of the lower casing section 11 so that the pump is at all times primed. In order to prevent clogging of the pump a screen 60 is preferably placed around the pump inlet 59, this screen preferably consisting of a box made of perforated sheet aluminum or the like.

The unit is set in the storage chamber or room to be cooled and air from this room is drawn down through the inlet box 24 into the lower part of the lower casing section 11. The air is then drawn upwardly past the lower spray nozzles 50, hairpin tubes 30 and upper nozzles 40. These nozzles spray water containing the antifreeze medium at high velocity into the air stream, thereby humidifying the air and by reason of their opposed relationship also spray the water against the hairpin tubes so as to create a whirling film of spray water around each of the tubes, this whirling film greatly increasing the heat transfer efficiency so that as the air stream passes the tubes it is quickly lowered in temperature and the heat rapidly absorbed by the refrigerant passing through the tubes. At the same time by the employment of an antifreeze medium in the spray water there is no danger of any ice formation on the tubes and frost cannot collect because the whirling films of water keep the tubes entirely free from all frost.

Instead of the usual salt in the spray water, I prefer to employ an antifreeze medium which is miscible with the water and which preferably comprises one of the higher alcohols. The water containing such antifreeze medium is supplied to the nozzles 40 and 50 by the pump 57 which withdraws the liquid from the bottom of the casing and through the rectangular filter box 60 and discharges it into the pipes 41 and 51 which carry the spray nozzles. The air leaving the cooling coils and the sprays is drawn upwardly past eliminator plates (not shown) and is discharged through the outlets 25 horizontally back into the room by the fans 23.

When the temperature of the refrigerating medium used in the hairpin tubes 30 is below the dewpoint of the air to be conditioned, this air is chilled below its dewpoint on passing the tubes and consequently water is precipitated from the air and mixes with the antifreeze solution in the bottom of the casing. It is apparent that this excess water must be discharged and if discharged by means of a simple overflow into a waste pipe a large amount of the antifreeze medium employed will be lost. Moreover, where the excess water is merely discharged it is, of course, necessary that the attendant keep track of the degree of concentration of the solution since otherwise freezing is apt to occur. Further, the higher alcohols which I prefer to employ are considerably more expensive than the salt usually employed in brine spray coolers and it would be highly uneconomical to waste such antifreeze solution.

To avoid these difficulties the present invention proposes to provide an automatic system for withdrawing the spray water solution from the bottom of the spray cooler when the dilution reaches a predetermined point, delivering the withdrawn solution to a regenerator or concentrator where it is concentrated and returning the concentrated solution to the spray cooler for reuse. The system is also applicable to a battery of spray coolers, only one control and regenerator being provided for the entire battery. Since the present invention proposes to employ a liquid which is miscible with water as the antifreeze medium it is necessary to provide special regenerating means for recovering this medium because of its expense and because of the difficulty inherent in separating such antifreeze liquid from the water.

As best shown in Fig. 1, a pipe 62 leads from the bottom of the spray cooler to the bowl 63 of a ball float valve 64, the pipe 62 maintaining the same level in the bowl 63 as the level of the spray liquid in the bottom of the spray cooler. The ball float control valve 64 is responsive to the level of the liquid in the bowl 63 and hence responsive to the level of the spray liquid in the bottom of the spray cooler and when this level rises above the setting of the ball float valve 64, this valve opens to permit spray water to flow from the pipe 56 on the outlet side of the pump 57 through pipes 67 and 68 to the regenerator indicated generally at 70.

The regenerator 70 is shown as comprising a concentrating tank 71 which is provided with a suitable thermal insulating jacket and is shown as supported on legs 72. The top of the concentrating tank 71 is shown as being of conical form from the apex of which a pipe 73 leads upwardly to a recovery tower 74. This recovery tower 74 acts in the manner of a fractionating tower to fractionally distil the vapors generated in the concentrating tank 71 so as to recover the higher boiling point fraction or higher alcohol vaporized in the concentrating tank 71 and return this higher boiling point fraction to the concentrating tank.

As best shown in Fig. 2, this bubble or recovery tower is of generally cylindrical form, and has a bottom wall 75, a top wall 76 and an intermediate horizontal partition 77 dividing the tower into a lower chamber 78 and an upper chamber 79. The vapor outlet pipe 73 at the apex of the concentrating tank 71 is secured to the lower end of a sleeve 80 secured in the bottom 75 of the tower 74. This sleeve discharges the vapors generated in the concentrating tank 71 into a bubble head, indicating generally at 85, which it supports.

This bubble head comprises an inverted cup shaped hub 86 the rim of which is screwed into the upper end of the sleeve 80 and which carries a pair of arms 87 which extend laterally in opposite directions from the hub 86 and also are curved downwardly, these arms supporting at their depressed outer ends a hollow horizontal ring 88 and forming conduits for supplying the vapor from the hub 86 to this ring 88. This ring is provided on its underside with an annular series of small openings 89 through which the vapors generated in the concentrating tank 71 emerge and bubble upwardly through the body of liquor 90 maintained in the bottom of the lower chamber 78 of the recovery tower 74. This body of liquor is maintained at a constant level by an overflow tube 91 which extends through and is secured at its upper end to the hub 86 and at its lower end extends into the body of liquor being concentrated in the concentrating tank 71, this level being maintained as hereinafter described. It will therefore be seen that the level of the liquor in the chamber 78 is always maintained at such a level that the bubble head 85 is submerged in this liquor.

The vapors from the chamber 78 escape through a central upstanding sleeve 95 in the central partition 77 of the recovery tower. On this sleeve is mounted a bubble head 85a which is constructed similarly to the bubble head 85 and the same reference numerals have therefore been applied to the bubble head 85a and distinguished by the suffix "a." The overflow pipe 96 for the upper chamber 79, instead, however, of being secured to the hub 86a of the bubble head 85a is arranged at one side of the recovery tower, its upper end extending above the level of the bubble head 85a so as to keep this bubble head submerged in a body of liquor 97, the lower end of this overflow pipe 96 being disposed below the level of the body of liquor 90 in the lower compartment 78 of the recovery tower.

The water vapors from the upper chamber 79 of the recovery tower escape through an outlet pipe 98.

In the form of the invention shown in Figs. 1 and 2 the pipe 68 which conducts the spray liquid to the regenerator under control of the float valve 64 is formed below the concentrating tank 71 to provide a generally horizontal coil and thence extends upwardly along one side of the concentrating tank to discharge into the upper part of the concentrating tank 71. This discharge is under control of a needle valve 99 which is set to control the amount of feed to give most efficient performance of the concentrator. The setting of this needle valve prevents delivery of dilute liquor into the concentrating tank in excess of this amount. To conserve heat, this coil of the liquor supply pipe 56 to the regenerator is jacketed by a pipe 100 which is sealed at its opposite ends and is employed to conduct the hot concentrate from the concentrating tank 71 back to the spray cooler for reuse. For this purpose an overflow pipe 101 is connected at its lower end to one end of the jacketing pipe 100 and is connected at its upper end to the central part of a stand pipe 102. Below its connection with the overflow pipe 101, this stand pipe 102 is connected by a branch 103 with the interior of the concentrating tank 71 and above its connection with the overflow pipe 101, this stand pipe is connected to the interior of the concentrating tank 71 as indicated at 104. The stand pipe 102 is also preferably extended downwardly below the concentrating tank 71, as indicated at 105, for cleanout purposes. It will be seen that the same level of liquor is maintained in the stand pipe 102 as in the concentrating tank 71, this level being maintained at the upper end of the overflow pipe 101. The connection of the upper end of the stand pipe 102 with the concentrating tank above the level of the liquor therein, avoids any unbalanced conditions in the level of liquor in the stand pipe and concentrating tank due to variations in pressure in the concentrating tank. Thus, by this upper connection of the stand pipe with the upper end of the concentrating tank, the pressure on the head of liquor in the stand pipe and in the concentrating tank will always be the same regardless of variation of the vapor pressure which is bound to occur within the concentrating tank as a part of its normal operation.

The flow of hot concentrated liquor from the overflow pipe 101 through the jacketing pipe 100 for the coil of the dilute liquor feed pipe 68 to the regenerator serves to preheat the dilute liquor admitted to the regenerator and also to cool the concentrated liquor before being returned to the spray cooler, the jacket 100 thereby acting as a heat exchanger to conserve heat. From this jacketing pipe 100, the concentrated liquor passes into a stand pipe 106 which is open to the atmosphere at its upper end, this end extending above the concentrating tank 71. At a point slightly below the level of the upper end of the overflow pipe 101 a horizontal return pipe 107 connects with the stand pipe 106, this return pipe discharging the concentrated liquor back into the spray liquor tank in the bottom of the lower spray cooler section 11, as best illustrated in Fig. 1. It will be seen that the elevation of the inlet end of the return pipe 107 maintains a column of liquid in the stand pipe 106, overflow pipe 101 and connecting jacket 100 which acts as a seal to prevent the escape of vapor from the concentrating tank 71 through the concentrated liquor return line.

The body of liquor within the concentrating tank 71 is shown as heated by an electric heating element 110 disposed in the bottom of the tank and supplied with current at, say, 440 volts by three power lines 111, 112 and 113. A manually operable throw switch 114 is provided in this power circuit and a magnetic contactor 115 is also provided in this power circuit. A float level control 116 and thermostat 117 are mounted in the side of the concentrating tank 71, these instruments having their sensitive parts normally immersed in the body of liquor being concentrated in the tank 71. The float level control 116 is arranged slightly below the liquor level normally maintained by the overflow pipe 101 in the concentrating tank and this float level control, the thermostat 117 and the coil of the magnetic contactor 115 are connected in series across the power lines 111 and 112. When the temperature of the liquor within the concentrating tank 71 rises above the setting of the thermostat 117 this thermostat opens the magnetic contactor 115 to deenergize the heating element 110. Similarly when the level of the liquor in the concentrating tank 71 drops below the sensitive elements of the float level control 116, this float level control opens the magnetic contactor 115 to deenergize the electric heating element 110. It will therefore be seen that during the periods when no dilute liquor is being delivered to the concentrating tank 71 and hence no load imposed thereon the heating element 110 is deenergized by the float level control 116 so as to avoid the useless consumption of electric current and an undesirable high concentration of the liquor retained in the concentrating tank 71.

To prevent a vacuum from forming in the concentrating tank 71 and also in the lower unvented chamber 78 of the recovery tower 74, a vent pipe 118 is provided for the concentrating tank, the lower end of which is sealed by the body of liquid therein and a similar vent pipe 119 is provided for this lower chamber 78 of the recovery tower, the lower end of this vent pipe 119 being arranged below and sealed by the body 90 of liquid therein. Without these vent pipes 119 and 120 when the apparatus was shut down the vapor in the concentrating tank 71 and lower chamber 78 of the recovery tower condensed and created a vacuum. This vacuum sucked out the body of liquid 97 in the upper chamber 79 of the recovery tower into the lower chamber 78 thereof and also sucked the body of liquid 90 in the lower chamber 78 of the recovery tower into the concentrating tank 71. As a result, on again starting the apparatus vapor would escape through the unsealed bubble heads 85, 85a of the recovery tower and its outlet 98 until enough of the vapor condensed in the chambers 78 and 79 to again provide a seal for these bubble heads. The vent pipes 118 and 119 prevent such vacuum from building up either in the concentrating tank 71 or the lower chamber 78 of the recovery tower. At the same time since the lower ends of these vent pipes 118 and 119 are sealed by the body of liquid contained in the chamber vented, vapor cannot escape through these vent pipes in the normal operation of the apparatus.

For the purpose of providing makeup water, a pipe 120 is provided having a valve 121 and through which water can be added to the spray water in the bottom of the spray cooler.

With the apparatus shown in Figs. 1 and 2, the liquor in the bottom of the spray cooler 9 is maintained at a constant concentration under conditions where it is subject to dilution as follows:

The antifreeze liquid which is added to the spray water to prevent freezing is preferably a liquid which is entirely miscible with water, such as one of the higher alcohols. The percentage of such antifreeze liquid to that of the water will depend upon the temperature of the refrigerant in the coil 30. Where the air drawn through the inlet box 24 and spray chamber by the fan wheels 23 which redischarge the air into the room is dehumidified on passing the sprays, the water condensed out of the air will join the spray water in the tank at the bottom of the cooler. The level of the spray water in the tank at the bottom of the section 11 therefore rises and the level of the liquid in the bowl 63 similarly rises to open the ball float valve 64. The opening of this ball float valve permits the dilute spray water under pump pressure to be discharged through the lines 67 and 68 into the upper part of the concentrating tank 71. In passing through that portion of the pipe 68 jacketed by the pipe 100, this dilute liquor is preheated by the hot concentrate returning through this jacket. The needle valve 99 is set to control the amount of feed of this dilute liquor to give the most efficient performance of the concentrator.

Assuming the heating element 110 at the bottom of the concentrating tank to be energized, the incoming dilute spray water joins the boiling body of liquor in the bottom of the concentrating tank, the vapors from which pass upwardly through the collar 80 in the bottom of the recovery tower 74 and thence into the lower bubble head 85. The vapors escape from this bubble head through the orifices 89 in the bottom of the ring 88 of this bubble head, the vapor thereby bubbling up through the body of liquor 90 maintained in the bottom of the recovery tower by the overflow pipe 91. In so bubbling through the body of liquor 90 the greater part of any of the higher boiling point components, such as the alcohol used to prevent freezing, is condensed out of the vapors and is returned through the overflow pipe 91 to the body of liquor in the concentrating tank 71.

This recovery process is repeated in the upper chamber 79 of the recovery tower escaping upwardly through the sleeve 95 and upper bubble head 85a. From this upper bubble head 85a the vapor bubbles through the orifices 89a through the body of liquor 97 maintained in this upper chamber of the recovery tower by the overflow pipe 96. In so bubbling through the body of liquor 97 in the upper chamber 79 of the recovery tower substantially all of the remaining higher boiling point component of the vapor is condensed and joins the body of liquor 97 to be returned through the overflow pipes 96 and 91 to the concentrating chamber. The substantially pure water vapor escapes through the outlet 98.

The exposed walls or shells of the chambers 78 and 79 of the bubble or recovery tower 74 condense a small amount of the vapor passing through these chambers. Since the vapor from the concentrating tank 71 contains only a small amount of the higher boiling point antifreeze component, the resultant condensate accumulating in the lower chamber 78 of the recovery tower is very dilute. Considerable of the antifreeze component entrained in the vapor from the concentrating tank is taken out as this vapor bubbles through the dilute liquid 90.

This recovery process is repeated in the upper chamber 79 of the bubble tower, and in bubbling through the body of liquor 97 in the upper chamber 79 of the bubble tower, substantially all of the remaining higher boiling point component of the vapor is condensed and joins the body of liquor 97 to be returned through the overflow pipes 96 and 91 to the concentrating tank 71. The condensate 97 in the chamber 79 is still weaker than the condensate 90 in the chamber 78 and the vapor which escapes from the body of liquid 97 contains practically no antifreeze component. The degree of recovery of the antifreeze component can be increased by using a greater number of chambers in the bubble tower. The substantially pure water vapor escapes through the vapor outlet 98.

In actual test on a concentrator with four recovery chambers in its bubble tower, where the concentrating tank 71 contained 50 to 60% concentration of a higher boiling point antifreeze component, the liquid from the first recovery chamber was from 20 to 30% concentration; the liquid from the second recovery chamber was from 10 to 20% concentration; the liquid from the third recovery chamber was from 5 to 10% concentration and the liquid from the last recovery chamber was from 3 to 7% concentration. The vapor from the last recovery chamber was then condensed and the condensate on test read 1.000 specific gravity, thereby indicating only the presence of water out to the fourth place. The concentrations of the bubble tower vary, depending on the quantity of vapor passing through and as the percentage of the higher alcohol in a vapor from an aqueous solution of any concentration is but a mere fraction of and in direct proportion to the percentage of the higher alcohol in the solution, it appears that the degree of concentration of the liquid bodies in the chambers of the bubble tower is more important than the temperature as the amount of the higher alcohol coming off of a solution corresponds to the concentration of the solution. The amount of higher alcohol in the vapor is a function of the vapor tension of that solution and becomes very small as the concentration is lowered. In actual practice, the degrees of concentration of the bodies of liquid in the several chambers of the bubble tower rise and fall in accordance with operating conditions.

The admission of dilute liquor to the concentrating tank 71 causes the liquid level in this tank to rise so that the concentrated mixture will pass out through the lower branch 103 of the stand pipe 102 and through the overflow pipe 101 to return by gravity to the bottom of the lower section 11 of the spray cooler through the jacket 100, stand pipe 106 and return line 107. In passing through the jacket 100, this hot concentrated liquor is cooled by the cold incoming dilute liquor fed to the concentrating tank 71. The return of this concentrated liquor to the tank at the bottom of the spray cooler increases the percentage of the higher boiling point component or antifreeze liquid in the spray liquor and prevents freezing of the spray liquor.

Since in regular operation condensing the mixture is all that increases the volume of spray liquor in the bottom of the spray cooler section 11 and causes discharge of diluted liquor into the concentrating tank 71, it will be seen that when such increase in volume occurs the concentrated liquor from the concentrating tank 71 will be returned to the bottom of the spray cooler. It is therefore apparent that the entire operation is automatic and will require no attention. Since none of the high boiling component can escape through the vapor outlet 98 with the water vapor no loss of the higher boiling component can occur during the regenerating operation. By making the various parts of the regenerator leaktight, the only possible loss of the higher boiling water component which can occur is due to its vaporization into the air while being sprayed into the air along with the spray water. Since the vapor pressure of the higher alcohols is very low only a minute amount of the antifreeze liquid can be lost and the only operating cost of the regenerating system is that for heat required to regenerate the spray liquor.

As previously stated certain gases in the form of esters, carbon dioxide, etc., are given off by food in cold storage due to ripening processes and these gases are cumulative unless removed from the air in the room. Such contaminating gases are soluble in the spray liquor up to a certain degree of concentration and hence it will be seen that the regenerator, as described, will operate to remove these contaminations. Thus, the contaminating gases are dissolved in the spray water and as the temperature is carried in the concentrating tank 71 above the boiling point of water, these contaminating gases are again volatilized and pass out with the water vapor at or near 212° F. through the vapor outlet 98 at the top of the recovery tower 74. The air in the room is thus automatically purged of these contaminations.

Should the amount of water condensed out of the air, particularly in wintertime, be insufficient to absorb and carry away these gases through the regenerative process, a small amount of fresh water can be fed into the spray water at the bottom of the spray cooler by opening the valve 121 in the water line 120, thus adding more water to the spray liquor for absorption of these gases. These contaminating gases are easily detected by their odor before their presence becomes sufficient in amount to affect the food in storage. The same purpose would be accomplished, of course, if an attendant poured a few gallons of water each day into the intake box 24 of the spray cooler. In the event that the dilution of the spray water in the spray cooler ceases, the float valve 64 closes, thereby cutting off the feed of dilute spray water to the concentrating tank 71. Under such conditions the boiling of the liquor in the bottom of the concentrating tank 71 will continue until the level of this liquor drops below the sensitive parts of the float level control 116. When this occurs the float level control 116 actuates the magnetic contactor 115 to open the circuit through the power lines to the heating element 110 and hence deenergize this heating element. This condition will obtain until dilution of the spray water in the spray cooler again occurs and a fresh charge of such dilute water is fed into the concentrating tank 71 to raise the level of the liquor therein above the sensitive elements of the float level control 116.

When the apparatus is shut down, a vacuum is prevented from building up in the concentrating tank 71 and the lower chamber 78 of the bubble or recovery tower 74 by the condensation of the vapor therein. This is prevented by the vent pipes 118 and 119, the lower ends of which are sealed by the liquid contained in this tank and chamber. These vent pipes 118 and 119 thereby prevent the liquid in the two chambers 78 and 79 of the recovery tower from being sucked into the concentrating tank 71 by this vacuum, such loss of this liquid being undesirable in that in again starting the apparatus, vapors would escape past the unsealed bubble heads 85, 85a and be lost until the sealing bodies 90 and 97 were again built up.

Referring to Fig. 3 there are illustrated two spray coolers A and B which are identical to the spray coolers illustrated in Fig. 1. The spray coolers A and B are connected by an equalizer pipe 125, this equalizer pipe serving to maintain the same level of spray water in the bottoms of the two spray coolers A and B. Where two or more spray coolers are thus connected in series the return pipe from the regenerator discharges into the spray cooler A thereby causing a drift of spray liquor back into the bottom of the spray cooler B. This spray cooler B is provided with a regenerating apparatus similar to that shown in Figs. 1 and 2 and hence the rising level of the spray liquor in the bottom of the spray cooler B will cause dilute spray liquor to be sent to the concentrating tank 71 as heretofore described, this spray liquor, when concentrated, being returned to the spray cooler A.

In the regenerating apparatus illustrated in Fig. 3 the concentrating tank and recovery tower are identical to that illustrated in Figs. 1 and 2 and hence the same reference numerals have been applied. In other respects the apparatus is, however, of somewhat different form, particularly in the respect that the regenerating apparatus illustrated in Fig. 3 employs steam as the heating medium instead of electricity.

In the regenerating apparatus illustrated in Fig. 3 the float valve 126, responsive to the level of the liquor in the bottom of the spray cooler B, permits the discharge of liquor by the pump 57 of the spray cooler B through the pipes 127 and 128 when the level of the liquor in the bottom of the spray cooler B rises above the setting of the float valve 126. After passing through the line 128 the line divides, one branch 129 discharging excess liquor passed by the ball float valve 126 into the spray cooler A, this excess liquor drifting back into the spray cooler B through the equalizer line 125. The other branch 130 discharges into the upper part of the concentrating tank 71 in the same manner as with the pipe 68 in the form of the invention illustrated in Figs. 1 and 2. This branch 130 has a portion jacketed by a pipe 131. A constant level of the liquor in the concentrating tank 71 is maintained by an overflow pipe 132 which has one branch 133 extending upwardly into the top of the concentrating tank and another branch 134 extending downwardly into the bottom of the concentrating tank. This overflow 132 connects with one end of the jacketing pipe 131 so that the hot concentrated liquor is employed to preheat the incoming dilute liquor passing through the pipe 130 and also to be cooled thereby. The other end of the jacketing pipe 131 connects with a return line 135 which returns the cool concentrated liquor to the bottom of the spray cooler A in the same manner as with the return line 107 in the form of the invention shown in Figs. 1 and 2. The admission of dilute liquor through the branch 130 to the concentrating tank 71 is preferably under control of a needle valve 136, this needle valve being set to the maximum efficient capacity of the concentrator.

To heat the body of liquor contained within the concentrating tank 71 a steam coil 140 is arranged within this body of liquor, the admission of steam to this coil being under control of a pressure reducing valve 141 which is set to maintain from 5 to 10 pounds of steam in the steam coil 140. The constant steam pressure maintained by the pressure reducing valve 141 maintains a constant temperature of the coil 140 which will only boil the liquid in the concentrating tank 71 when its concentration is such that its boiling point is lower than the steam temperature. As the feed liquid is fed to the concentrating tank, it dilutes the liquid in the tank and this dilute liquid boils. When the feed of liquid to the concentrating tank 71 is stopped, the liquid in the tank continues to boil and reduce the level below the overflow until the concentration has a boiling point equivalent to or below the temperature of the steam. The vaporization of the liquid in the concentrating tank is thereby substantially stopped until dilute liquid is again added to cause it to boil. When the liquid is not boiling there is no steam consumption except to make up for heat losses in the equipment.

It will be seen that the operation of the regenerating apparatus illustrated in Fig. 3 is essentially similar to that illustrated in Figs. 1 and 2, the ball float valve 126 delivering the dilute liquor from the spray cooler B to the concentrating tank 71 where it is concentrated, all of the higher boiling point component of the vapors generated in the concentrating tank 71 being recovered and returned by the recovery tower 74. The concentrated liquor in the concentrating tank 71 overflows into the line 132 which returns it to the spray cooler A after being cooled by its passage through the heat exchanger jacket 131. This concentrated liquor drifts back to the spray cooler B through the drift pipe 125, thereby to maintain uniform conditions of the spray water in each of the spray coolers. The concentrating tank 71, instead of being heated by an electric element as in the form of the invention shown in Figs. 1 and 2, is heated by the steam coil 140, which is maintained at a constant temperature so as to boil the liquid only when it is diluted by feed liquor to an extent that its boiling point drops below the constant temperature of the steam coil.

From the foregoing it will be seen that the present invention provides a simple, efficient and fully automatic bubble tower for regenerating spray water containing an antifreeze solution, particularly where the antifreeze solution employed is one of the higher alcohols which is difficult to separate from water by ordinary distillation. It will therefore be seen that the invention is particularly applicable for use in air conditioning systems for cold storage rooms and the like in which the air is maintained under conditions of relatively high humidity but in which water is given off by the foods under process which water dilutes the spray water employed. It will further be seen that the bubble tower is simple and inexpensive in construction and can be installed at low cost.

I claim as my invention:

A bubble tower comprising a shell having at least two superposed chambers, an overflow conduit extending from a point above the bottom of the upper of said chambers to a point adjacent the bottom of the lower of said chambers and maintaining a body of liquid in the upper of said chambers, a second overflow conduit extending from a point above the lower end of the first overflow conduit in the lower of said chambers and maintaining a body of liquid in the lower of said chambers, a vapor line leading to the lower of said chambers, a bubble head connected with said vapor line and discharging the vapors under the surface of the body of liquid maintained in the lower of said chambers to bubble up therethrough, a second vapor line leading from the top of the lower of said chambers to the upper of said chambers, a second bubble head connected with said second vapor line and discharging the vapors from the lower of said chambers under the surface of the body of liquid maintained in the upper of said chambers to bubble up therethrough, a vent pipe connected with the lower of said chambers at a point below the level of the body of liquid maintained therein and extending upwardly to a point above the bubble tower, and a vapor outlet from the upper of said chambers.

JOHN WALTER OLSTAD.